No. 695,449. Patented Mar. 18, 1902.
W. H. EXLEY.
SPOKE CUTTER AND BEVELER.
(Application filed June 28, 1901.)
(No Model.)
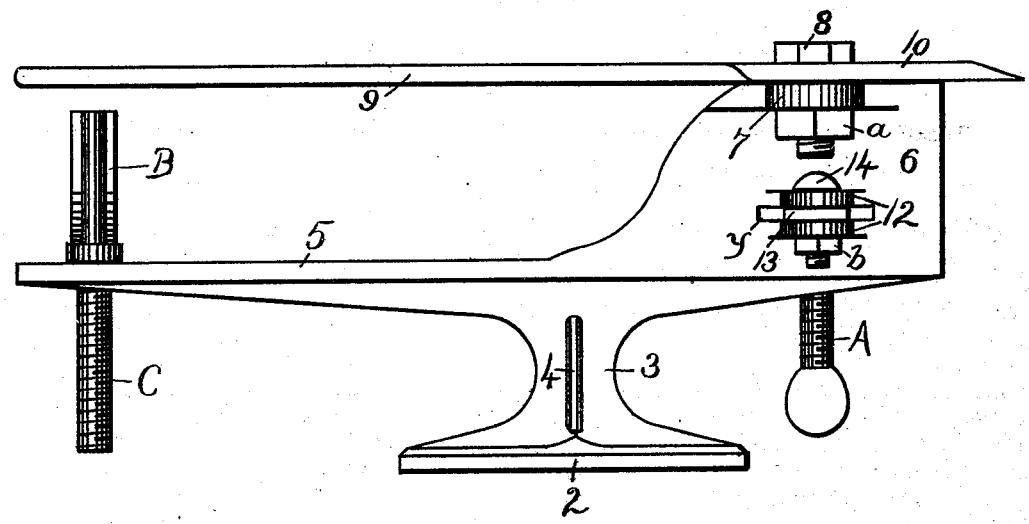
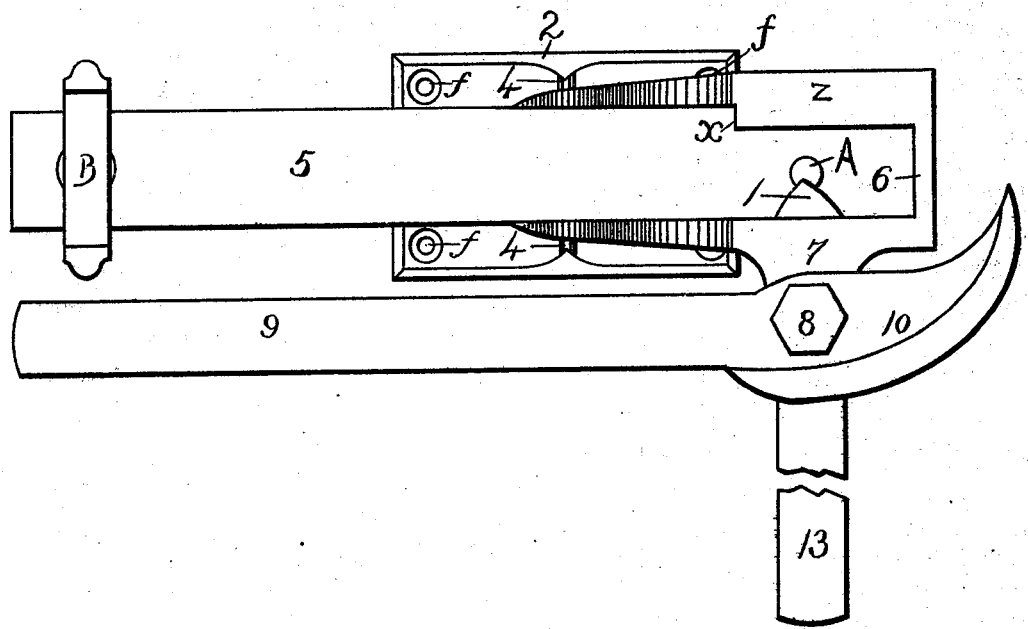
WITNESSES:
R. J. Davenport.
N. Boehhoff.
INVENTOR
William H. Exley,
PER Geo. W. Sue.
ATTY.

UNITED STATES PATENT OFFICE.

WILLIAM H. EXLEY, OF PALMYRA, NEBRASKA.

SPOKE CUTTER AND BEVELER.

SPECIFICATION forming part of Letters Patent No. 695,449, dated March 18, 1902.

Application filed June 28, 1901. Serial No. 66,395. (No model.)

*To all whom it may concern:*

Be it known that I, WILLIAM H. EXLEY, residing at Palmyra, in the county of Otoe and State of Nebraska, have invented certain useful Improvements in Spoke Cutters and Bevelers; and I do hereby declare that the following is a full, clear, and exact description thereof, such as will enable others skilled in the art to which it appertains to make and use the same, reference being had to the accompanying drawings, which form a part of this specification.

This invention relates to a new and improved spoke cutter and beveler.

The object of my invention is to provide a simple adjustable cutter adapted to be used in shaving off the tenons of spokes, so that they may be snugly and securely fastened into the hub-sockets, as will be described more fully hereinafter.

In the accompanying drawings I have shown in Figure 1 a side elevation of a spoke cutter and beveler embodying my invention, while Fig. 2 shows a top view, with a portion broken away, of a cutter and beveler embodying my invention.

My invention embodies, essentially, a base-plate 5 of a suitable length, which plate is provided with the neck 3, from which extends the foot 2, which is provided with suitable openings $f$, by means of which the cutter is secured to a suitable foundation. The neck 3 is strengthened by means of the webs 4 4.

Extending upward from the base-plate 5 at one end is a three-sided housing 6, which upon one side and interiorly is provided with a little projecting shoulder $x$, against which the shoulder of the spoke to be cut and beveled is placed to prevent the same from moving forward with the cutter-knife in trimming the spokes. This housing 6 is provided with a smooth upper surface, so as to form a shearing-base for a suitable curved knife, which is adapted to work over this upper cutting-face $z$.

Extending laterally from one side of the housing 6 is an ear 7, (shown more clearly in Fig. 1,) to which ear 7 is secured, by means of the bolt 8, a cutter-knife comprising the curved blade 10, provided with the projecting handle 9, so that a proper leverage may be secured. The bolt 8 is secured by means of the nut $a$.

The housing 6 is provided with a slot $y$ within the side opposite the little projecting shoulder $x$, as is shown in Fig. 1, and this slot $y$, which extends in a horizontal plane, is flanked by the perforated ears 12 12, through which extends the bolt 14, provided below with a suitable nut $b$, and this bolt 14 holds a clamping-lever 13, the pointed end 1 of which extends into the housing 6, so as to pinch and hold the spoke end to be shaved against the housing side adjacent the shoulder $x$, so that the spoke while being trimmed is held as in a vise by means of this lever 13, which is of a length sufficient to be properly operated. At a point approximately below the entry of the lever 13 the housing is provided with a set-screw A, which forms an adjustable base upon which the spoke-tenons rest, so that the spokes may be accurately cut and beveled. From this it will be seen that after the spokes are placed within the housing they rest upon an adjustable base and are further removably held by means of a vise formed by virtue of the housing and the lever 13. In order to provide further accuracy, and so that the spoke ends may be nicely trimmed, I provide the holder B, which extends through a threaded opening within the base-plate 5, being provided with the screw C, the angle of the tenon within one plane being adjusted by means of this holder B, which may be raised or lowered to suit the conditions. This holder B may be adjusted to half-turns, while the screw A of course may be given any desired adjustment. From this it will be noticed that the device is neat and simple of construction and may be readily operated, and

Having thus described my said invention, what I claim as new, and desire to secure by United States Letters Patent, is—

1. In a spoke cutter and beveler, the combination with a base-plate, of a topless housing secured near one end to said base-plate, said housing being provided with a suitable slot upon one side, of a knife secured to the top of said housing, a clamping-lever extending through the slot within said housing, and an adjustable holder secured to the remaining end of said base-plate.

2. The combination with a suitable base-plate provided near one end with a three-sided topless housing, said housing being provided interiorly upon one side with a projecting shoulder and upon the opposite side with a slot, of a lever pivoted to said housing and extending into the same through the said slot, a cutter-knife secured to the top of said housing, an adjusting-screw entering the bottom of said housing, and a holder adjustably secured to the opposite remaining end of said base-plate, substantially as set forth.

WILLIAM H. EXLEY.

In presence of—
 ALFRED ROBERT EXLEY,
 GEORGE H. EXLEY.